(12) United States Patent
Chen

(10) Patent No.: US 8,772,558 B2
(45) Date of Patent: Jul. 8, 2014

(54) METHODS AND APPARATUSES FOR PRODUCING AROMATIC HYDROCARBON-CONTAINING EFFLUENT

(75) Inventor: John Qianjun Chen, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 379 days.

(21) Appl. No.: 13/191,213

(22) Filed: Jul. 26, 2011

(65) Prior Publication Data

US 2013/0030228 A1 Jan. 31, 2013

(51) Int. Cl.
*C10G 1/00* (2006.01)

(52) U.S. Cl.
USPC ........... 585/240; 585/241; 585/242; 585/400; 585/404; 585/408; 585/409; 585/469

(58) Field of Classification Search
USPC .......... 585/400, 404, 408, 409, 469; 208/113, 208/120.35, 121
See application file for complete search history.

(56) References Cited

U.S. PATENT DOCUMENTS

| | | | |
|---|---|---|---|
| 4,052,292 A | 10/1977 | Espenscheid et al. | |
| 4,087,318 A | 5/1978 | Samuelson et al. | |
| 4,141,786 A | 2/1979 | Eckert | |
| 4,207,076 A | 6/1980 | Bove et al. | |
| 4,385,193 A * | 5/1983 | Bijwaard et al. | 585/310 |
| 4,401,561 A * | 8/1983 | Thompson et al. | 208/212 |
| 4,420,644 A | 12/1983 | Huibers et al. | |
| 4,436,586 A | 3/1984 | Elmore | |
| 4,647,704 A | 3/1987 | Engel et al. | |
| 4,992,605 A | 2/1991 | Craig et al. | |
| 5,019,135 A | 5/1991 | Sealock, Jr. et al. | |
| 5,959,167 A | 9/1999 | Shabtai et al. | |
| 5,961,786 A | 10/1999 | Freel et al. | |
| 7,578,927 B2 | 8/2009 | Marker et al. | |
| 7,867,296 B2 | 1/2011 | Montague et al. | |
| 8,063,258 B2 | 11/2011 | Bartek et al. | |
| 2003/0115792 A1 | 6/2003 | Shabtai et al. | |
| 2007/0095787 A1 | 5/2007 | Mezzapelle | |
| 2008/0050792 A1 | 2/2008 | Zmierczak et al. | |
| 2008/0076945 A1 | 3/2008 | Marker et al. | |
| 2008/0216391 A1 | 9/2008 | Cortright et al. | |
| 2008/0312346 A1 | 12/2008 | McCall et al. | |
| 2008/0312479 A1 | 12/2008 | McCall et al. | |
| 2009/0037281 A1 | 2/2009 | Devlin et al. | |
| 2009/0218061 A1 | 9/2009 | Schinski et al. | |

(Continued)

FOREIGN PATENT DOCUMENTS

| | | |
|---|---|---|
| CA | 536549 A | 1/1957 |
| WO | 2006119357 A2 | 11/2006 |

OTHER PUBLICATIONS

Fogler, H.S. (1992). Elements of Chemical Reaction Engineering, $2^{nd}$ ed., Prentice Hall, 838 pgs.*

(Continued)

*Primary Examiner* — Brian McCaig
(74) *Attorney, Agent, or Firm* — Maryann Maas

(57) ABSTRACT

Embodiments of methods and apparatuses for producing an aromatic hydrocarbon-containing effluent are provided herein. The method comprises the step of rapidly heating a biomass-based feedstock to a first predetermined temperature of from about 300 to about 650° C. in the presence of a catalyst, hydrogen, and an organic solvent within a time period of about 20 minutes or less to form the aromatic hydrocarbon-containing effluent. The biomass-based feedstock comprises lignocellulosic material, lignin, or a combination thereof.

17 Claims, 1 Drawing Sheet

(56) References Cited

U.S. PATENT DOCUMENTS

| | | | |
|---|---|---|---|
| 2009/0253947 | A1 | 10/2009 | Brandvold et al. |
| 2009/0283442 | A1 | 11/2009 | McCall et al. |
| 2009/0294324 | A1 | 12/2009 | Brandvold et al. |
| 2009/0300971 | A1 | 12/2009 | Abhari et al. |
| 2009/0301930 | A1 | 12/2009 | Brandvold et al. |
| 2009/0326286 | A1 | 12/2009 | Yie et al. |
| 2010/0000443 | A1 | 1/2010 | Kawai et al. |
| 2010/0043279 | A1 | 2/2010 | Abhari et al. |
| 2010/0137663 | A1 | 6/2010 | Chen et al. |
| 2010/0137665 | A1 | 6/2010 | Chen |
| 2010/0312027 | A1 | 12/2010 | Tsurutani et al. |
| 2011/0094147 | A1* | 4/2011 | Bartek et al. ............ 44/282 |
| 2011/0167713 | A1* | 7/2011 | Quignard et al. ........ 44/307 |
| 2011/0220053 | A1 | 9/2011 | Croft et al. |
| 2012/0005949 | A1 | 1/2012 | Stevens et al. |

OTHER PUBLICATIONS

Tang, Zhel et al. "Catalytic Hydrocracking of Pyrolytic Lignin to Liquid Fuel in Supercritical Ethanol" Industrial and Engineering Chemistry Research, v 49, n 5, p. 2040-2046, Mar. 3, 2010; ISSN: 08885885, E-ISSN: 15205045; DOI: 10.1021/ie9015842; Publisher: American Chemical Society.

Shabtai, J. et al. "Conversion of Lignin—2. Production of High-Octane Fuel Additives" ACS 217th National Meeting (Anaheim 3/21-25199) ACS Division of Fuel Chemistry Preprints (ISSN 0569-3772) V44 N.2 267-72 (1999).

Thring, Ronald W. et al. "Hydrocracking of Solvolysis Lignin in a Batch Reactor" Fuel, v 75, n 7, p. 795-800, May 1996; ISSN: 00162361; DOI: 10.1016/0016-2361(96)00036-1; Publisher: Elsevier Ltd.

Jones, S.B. et al. "Production of Gasoline and Diesel from Biomass via Fast Pyrolysis, Hydrotreating and Hydrocracking: A Design Case" Department of Energy, Washington, DC.; Report: PNNL-18284, 76p, Feb. 2009.

Davis, H.G. "Direct Liquefaction of Biomass. Final Report and Summary of Effort, 1977-1983 (Wood-Derived Oils)" Department of Energy, Washington, DC.; Report: LBL-16243, 94p, Jun. 1983.

Brandvold, T., et al., "Methods and Apparatuses for Producing Aromatic Hydrocarbon-Rich Effluent From Lignocellulosic Material," U.S. Appl. No. 13/191,211, filed Jul. 26, 2011.

U.S. Appl. No. 13/190,751, filed Jul. 26, 2011, Chen et al.

U.S. Appl. No. 13/191,211, filed Jul. 26, 2011, Brandvold et al.

Chen, J.Q., "Methods and Appratuses for Producing Aromatic Hydrocarbon-Containing Effluent," U.S. Appl. No. 13/191,213, filed Jul. 26, 2011.

Meier, D.; (Sep. 29, 2008-Oct. 1, 2008) Catalytic hydrocracking of lignins to useful aromatic feedstocks:; Source: DGMK Tagungsbericht, No. 3, Conference: DGMK Tagungsbericht Mar. 2008—Future Feedstocks for Fuels and Chemicals, pp. 299-304, 2008.

Okuda, Kazhide et al.; (Apr. 14, 2004) "Efficient conversion of lignin into single chemical species by solvothermal reaction in water-p-cresol solvent", Source: Journal of Physics Condensed Matter, vol. 16, No. 14, pp. S1325-S1330, Proceedings of the joint 19th AIRAPT and 41st EHPRG International Conference on High Pressure Science and Technology.

Johnson, D.K. et al.; (Mar. 2002) Conversion of lignin into a hydrocarbon product for blending with gasoline:; Source: ACS Division of Fuel Chemistry, Preprints, vol. 47, No. 1, pp. 380-381.

Kleinert, M. et al.; (Mar./Apr. 2008) "Towards a lignincellulosic biorefinery: Direct one-step conversion of lignin to hydrogen-enriched biofuel"; Source: Energy and Fuels; vol. 22, No. 2, pp. 1371-1379.

Bridgwater, A.V.; (2004) "Biomass Fast Pyrolysis"; Source: Review paper BIBLID: 0354-9836, vol. 8, No. 2, pp. 21-49.

Robinson, J.M. et al.; (May 2004) "The use of catalytic hydrogenation to intercept carbohydrates in a dilute acid hydrolysis of biomass to effect a clean separation from lignin"; Source: Biomass and Bioenergy, vol. 26, No. 5, pp. 472-483.

Nagy, Mate, et al.; (Sep. 1, 2009) Catalytic hydrogenolysis of ethanol organosolv lignin:; Source: Holzforschung, vol. 63, No. 5, pp. 513-520.

Ye, Jie-Wang et al.; (Mar. 2006) "Hydrogenation of straw alkali lignin catalysed by Pd/C catalyst"; Source: Zhongguo Xuebao/ Transactions of China Pulp and Paper, vol. 21, No. 1, pp. 73-76; Language: Chinese.

De Wild, Paul et al.; (Oct. 2009) "Lignin valorisation for chemicals and (transportation) fuels via (catalytic) pyrolysis and hydrodeoxygenation", Source: Environmental Progress and Sustainable Energy, vol. 28, No. 3, pp. 461-469, GTI-TechBioMass.

* cited by examiner

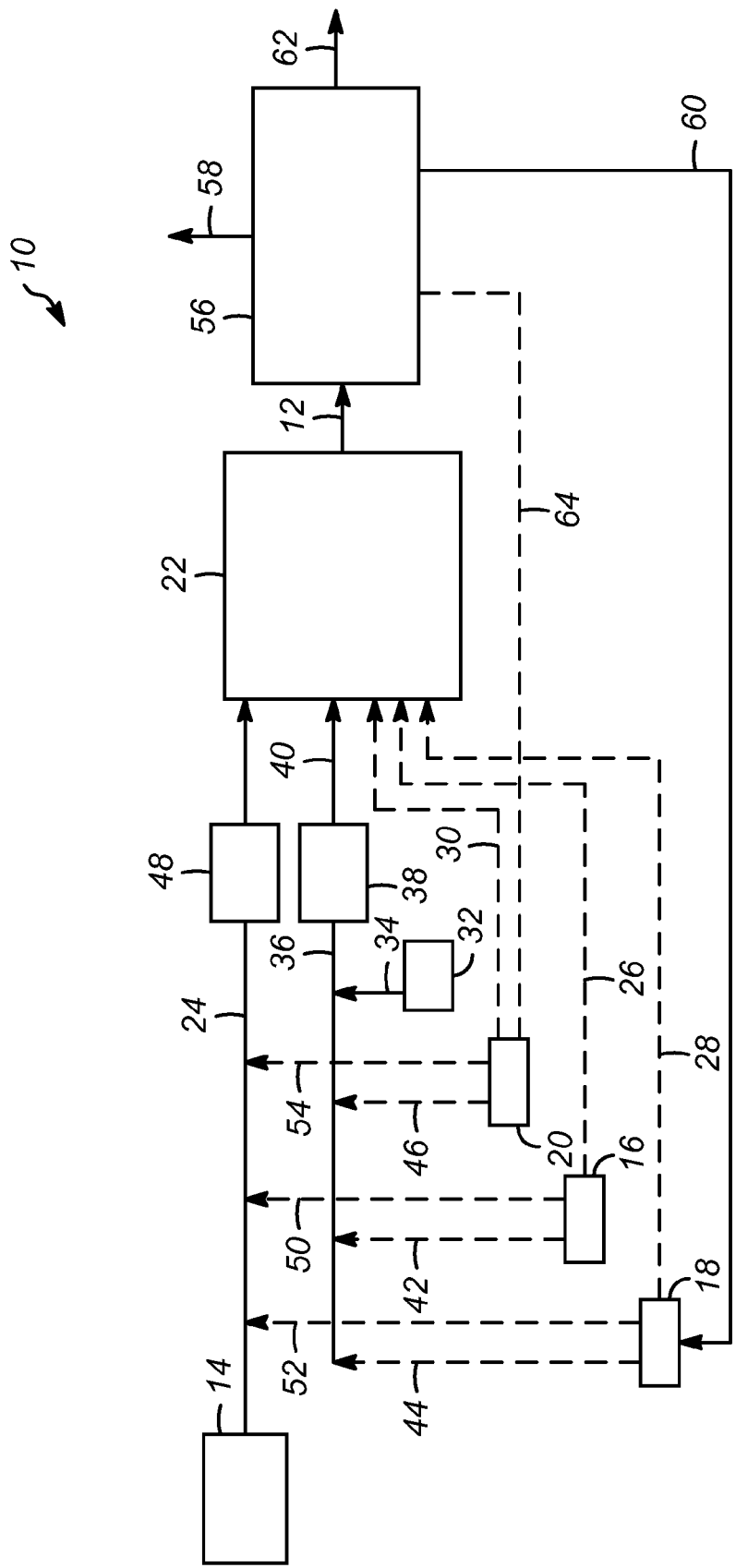

METHODS AND APPARATUSES FOR PRODUCING AROMATIC HYDROCARBON-CONTAINING EFFLUENT

FIELD OF THE INVENTION

The present invention relates generally to methods and apparatuses for producing chemical constituents and biofuels, and more particularly to methods and apparatuses for producing aromatic hydrocarbon-containing effluent from lignocellulosic material and/or lignin.

BACKGROUND OF THE INVENTION

Emphasis on renewable energy sources has been increasing due to concerns for reducing fossil fuel greenhouse gas emissions, reducing dependence on imported oil, providing a substitute for fossil fuels, and providing basic chemical constituents to be used in other industries, such as chemical monomers (e.g. xylene and ethylene glycol) for making plastics and the like. Biomass material, which is also referred to herein as lignocellulosic material, represents a vast amount of renewable resources available in virtually every part of the world and has the potential to satisfy at least some of the needs for sources of fuels and chemicals.

Lignocellulosic material is biomass that contains lignin, and cellulose or hemicellulose. Lignocellulosic materials include, but are not limited to, plant parts, fruits, vegetables, plant processing waste, wood chips, chaff, grain, grasses, corn, corn husks, and other agricultural residues, weeds, energy crops, aquatic plants, hay, paper, paper products, recycled paper and paper products, and any other lignin and cellulose or hemicellulose containing materials of biological origin. Lignin bonds to the cellulose or hemicellulose and has a molecular structure of a cross-linked phenolic polymer having an abundance of aromatic rings. Lignin is generally present in lignocellulosic material in an amount of about 15 to about 30 percent or more by weight. The aromatic hydrocarbon compounds that can be recovered from lignin (e.g., alkylbenzene compounds and phenolic compounds) are valuable and can be used to produce various fuels and basic chemical constituents.

One conventional process for recovering aromatic hydrocarbon compounds from biomass is fast pyrolysis. In fast paralysis, the lignocellulosic material is heated to about 300 to about 900° C. in the absence of air forming solid products, liquid products, and gaseous pyrolysis products. A condensable portion (vapors) of the gaseous pyrolysis product is condensed into biomass-derived pyrolysis oil. Biomass-derived pyrolysis oil is a complex, highly oxygenated organic liquid having properties that currently limit its direct utilization as a biofuel or as a basic chemical constituent. Conversion of biomass-derived pyrolysis oil into an aromatic hydrocarbon-containing product that is useful as a biofuel and/or a basic chemical constituent requires additional operations to fully or partially deoxygenate the biomass-derived pyrolysis oil. These additional operations are expensive and time-consuming.

Another conventional process for recovering aromatic hydrocarbon compounds from biomass is by extracting and depolymerizing its lignin. As discussed in U.S. Pat. No. 5,959,167 and U.S. Patent Application Number 2010/0137663, lignin is depolymerized by exposing the lignin to a base catalyst having a pH of about 12.4 followed by hydrotreating to partially convert the lignin into aromatic hydrocarbon compounds. Unfortunately, this process requires large amounts of caustic materials for depolymerizing the lignin and therefore, is not environmentally friendly. Moreover, this process is relatively inefficient in that large amounts of the lignin are converted to coke rather than to aromatic hydrocarbon compounds.

Accordingly, it is desirable to provide methods and apparatuses for converting lignocellulosic material and/or lignin into an aromatic hydrocarbon-containing product without requiring expensive and time-consuming operations. Moreover, it is desirable to provide methods and apparatuses that are environmentally-friendly for converting lignocellulosic material and/or lignin into an aromatic hydrocarbon-containing product. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods and apparatuses for producing an aromatic hydrocarbon-containing effluent from lignocellulosic material and/or lignin are provided herein. In accordance with an exemplary embodiment, a method for producing an aromatic hydrocarbon-containing effluent comprises the step of rapidly heating a biomass-based feedstock to a first predetermined temperature of from about 300 to about 650° C. in the presence of a catalyst, hydrogen, and an organic solvent within a time period of about 20 minutes or less to form the aromatic hydrocarbon-containing effluent. The biomass-based feedstock comprises lignocellulosic material, lignin, or a combination thereof.

In accordance with another exemplary embodiment, a method for producing an aromatic hydrocarbon-containing effluent is provided. The method comprises the steps of rapidly heating a first quantity of a biomass-based feedstock in a reactor to a first predetermined temperature of from about 300 to about 600° C. in the presence of a catalyst, hydrogen, and an organic solvent within a first time period of about 20 minutes or less to form a first quantity of the aromatic hydrocarbon-containing effluent. The biomass-based feedstock comprises lignocellulosic material, lignin, or a combination thereof. The first quantity of the aromatic hydrocarbon-containing effluent is removed from the reactor. At least a portion of the first quantity of the aromatic hydrocarbon-containing effluent is recycled back to the reactor. A second quantity of the biomass-based feedstock is rapidly heated in the reactor to the first predetermined temperature in the presence of the catalyst, hydrogen, and the at least the portion of the first quantity of the aromatic hydrocarbon-containing effluent within a second time period of about 20 minutes or less to form a second quantity of the aromatic hydrocarbon-containing effluent.

In accordance with another exemplary embodiment, an apparatus for producing an aromatic hydrocarbon-containing effluent is provided. The apparatus comprises a reactor that is configured to rapidly heat a biomass-based feedstock to a first predetermined temperature of from about 300 to about 650° C. in the presence of a catalyst, hydrogen, and an organic solvent within a time period of about 20 minutes or less to form the aromatic hydrocarbon-containing effluent. The biomass-based feedstock comprises lignocellulosic material, lignin, or a combination thereof.

BRIEF DESCRIPTION OF THE DRAWINGS

Embodiments of the present invention will hereinafter be described in conjunction with the following drawing figures, wherein like numerals denote like elements, and wherein:

FIG. 1 schematically illustrates an apparatus for producing an aromatic hydrocarbon-containing effluent in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding Description of Related Art or the following Detailed Description.

Various embodiments contemplated herein relate to methods and apparatuses for producing an aromatic hydrocarbon-containing effluent from a biomass-based feedstock. The biomass-based feedstock comprises lignocellulosic material and/or lignin. Lignocellulosic material includes various "lignocellulosic components." As used herein, the term "lignocellulosic component" is defined as a material comprising lignin, cellulose or hemicellulose. Lignin is a cross-linked, macromolecule comprised of aromatic elements derived from phenol and is found in most vegetative biomass. Cellulose is a crystalline polysaccharide of a non-cross-linked long chain $(C_6H_{10}O_5)_n$ having monomeric units (e.g., glucose) that are interlinked by β1-4 bonds. Hemicellulose is a branched short chain polysaccharide heteropolymer with an amorphous structure, and is made up of monomers such as glucose, xylose (its main component), mannose, galactose, rhamnose and arabinose.

Unlike the prior art, the exemplary embodiments taught herein rapidly heat the biomass-based feedstock to a first predetermined temperature of from about 300 to about 650° C. in the presence of a catalyst, hydrogen, and an organic solvent within a time period of about 20 minutes or less to form an aromatic hydrocarbon-containing effluent. The inventors have found that by rapidly heating the biomass-based feedstock in the presence of the catalyst, hydrogen, and the organic solvent, an improved process for breaking down lignocellulosic material and/or lignin into useful aromatic hydrocarbon compounds is provided. In an exemplary embodiment, the organic solvent is rich in aromatic hydrocarbons and preferably, has the capacity to facilitate hydrogen transfer in the reaction medium. Without being bound by theory, it is believed that the hydrogen transfer functionality of the aromatic hydrocarbon-rich organic solvent facilitates formation of the aromatic hydrocarbon-containing effluent while limiting detrimental coke formation and/or re-polymerization reactions that limit conversion and reduce product yields, as well as shorten catalyst life. In an exemplary embodiment, the conversion of the biomass-based feedstock is about 90% or greater with about 80% or greater selectivity (on carbon basis) towards forming aromatic hydrocarbons to produce an effluent that is rich in aromatic hydrocarbons and that may be used as a precursor to or directly as a biofuel and/or as a basic chemical constituent with little or no additional operations required to fully or partially deoxygenate the effluent. Moreover, the methods and apparatuses contemplated herein do not use caustic materials for depolymerizing the lignin and therefore, are environmentally-friendly for converting lignocellulosic material and/or lignin to an aromatic hydrocarbon-containing product.

Referring to FIG. 1, a schematic depiction of an apparatus 10 for producing an aromatic hydrocarbon-containing effluent 12 from a biomass-based feedstock 14 in accordance with an exemplary embodiment is provided. Components for producing the aromatic hydrocarbon-containing effluent 12 include the biomass-based feedstock 14, a catalyst 16, an organic solvent 18, and a hydrogen-containing gas 20. The biomass-based feedstock 14 comprises lignocellulosic material, lignocellulosic components including lignin, or combinations thereof. Non-limiting examples of lignocellulosic material or sources of lignocellulosic components include any biomass material that contains lignin and cellulose or hemicellulose, such as, for example, natural raw materials that originate from agricultural crops such as sugarcane, corn or sorghum, sugarcane bagasse, sugarcane straw, corn straw, corn cobs, sorghum straw or other agricultural materials, urban or industrial residues, as well as residues originating from fishing, animal breeding or mining activities, such as beets, manioc, wheat or rice straw, peanut shells or coconut shells, wood kindling, wood chips, sawdust, charcoal, wax palm (e.g., Carnaba) leaves, babassu palm (e.g., Babac) residues, various types of grass, leaves and branches of soy plants, waste products from the production of vegetable oils, such as filtercakes obtained from the production of oils of soy, of castor oil plants and of other oleaginous plants, recycled paper and paperboard, lignin and other residues from the paper and pulp industry originating from crops, such as eucalyptus and pine. Other sources of lignocellulosic materials or sources of lignocellulosic components include, but are not limited to, municipal waste, garbage, and the like.

In an exemplary embodiment, the catalyst 16 provides a metal function, an acid function, or a combination of metal and acid functions. The metal function imparts a hydrogenation function to the catalyst 16 in the presence of hydrogen that promotes the deoxygenation of the lignocellulosic material and/or lignin and its depolymerized constituent to produce aromatic hydrocarbons and water. Non-limiting examples of materials that provide a metal function to the catalyst 16 include noble metals, transition metals, transition metal sulfides, nitrides, carbides, and combinations thereof.

The acidic function imparts acidity to the catalyst 16. Non-limiting examples of materials that provide the acid function to the catalyst 16 include large and/or medium pore acidic zeolite catalysts, such as FAU type zeolites, EMT type zeolites, beta zeolites, mordenite, MFI type zeolites, MEL type zeolites, mesopore zeolites, and other large and/or medium pore zeolites as described in *Atlas of Zeolite Framework Types*, 6th Revised Edition, C. H. Baerlocher, L. B. McCusker, and D. H. Olson, editors, Elsevier (2007).

In an exemplary embodiment, the catalyst 16 provides the acid function by including a metal dispersed on a slightly acidic support material. Non-limiting examples of metals for inclusion in the catalyst include chromium, molybdenum, tungsten, nickel, cobalt, palladium, platinum, and combinations thereof. Non-limiting examples of slightly acidic support materials include alumina, silica-alumina, and combinations thereof. Preferably, the silica-alumina is an acidic and amorphous material that has been cogelled or coprecipitated. The metals can be sulfided as a single metal sulfide or mixed metal sulfides. Non-limiting examples of mixed metal sulfides include nickel molybdenum sulfide, nickel tungsten sulfide, cobalt molybdenum sulfide, cobalt tungsten sulfide, and combinations thereof.

In another exemplary embodiment, the metal function is dispersed on a non-acidic support material. Non-limiting examples of non-acidic support materials include inorganic oxides, boron nitrides, silica, titania, zirconia, carbon, silicon carbide, magnesia, non-acidic silica-alumina, non-acidic molecular sieves, and combinations thereof. Non-limiting examples of molecular sieves include zeolites, such as beta zeolite, Y-zeolite, MFI type zeolites, MEL type zeolites mordenite, silicalite, SM3, faujasite, other zeolites as described in *Atlas of Zeolite Framework Types*, 6th Revised Edition, C. H. Baerlocher, L. B. McCusker, and D. H. Olson, editors, Elsevier (2007), and combinations thereof. The acidity of the catalyst support can be modified by treating the support material with elements selected from alkali (e.g., Group 1) or alkaline earth (e.g., Group 2) metals, and combinations thereof. Non-limiting examples of alkali metals include Li, Na, K, and Ba, and non-limiting examples of alkaline earth metals include Ca and Mg.

The organic solvent 18 facilitates the ability of the catalyst 16 to convert the lignocellulosic components of the biomass-based feedstock 14 into aromatic hydrocarbons. Non-limiting examples of the organic solvent 18 include aromatic hydrocarbon compound-containing solvents, such as $C_6$-$C_{20}$ single ring aromatics, benzene, toluene, xylene, and the like, and sulfur-containing organic compounds, and oxygen containing organic compounds such as phenolic compounds, $C_{10}$-$C_{40}$ multi-ring aromatics mixtures, LCO (light cycle oil), thiophenes, benzothiophenes and derivatives, thiols, and combinations thereof. As used herein, $C_x$ compounds mean organic molecules that have "X" number of carbon atoms. In an exemplary embodiment, the organic solvent 18 comprises at least about 50 weight percent (wt. %) of aromatic hydrocarbons, preferably at least about 80 wt. %, and more preferably at least about 95 wt. % of aromatic hydrocarbons.

The hydrogen-containing gas 20 provides $H_2$ to facilitate the hydrogenation function of the catalyst 16 for the depolymerization and deoxygenation of the lignocellulosic material and/or lignin to produce aromatic hydrocarbons. In an exemplary embodiment, the hydrogen-containing gas 20 has a hydrogen purity of from about 10 to about 99.9 wt. %. The hydrogen-containing gas 20 may also contain $H_2S$.

The biomass-based feedstock 14, the catalyst 16, the organic solvent 18, and the hydrogen-containing gas 20 are introduced to a reactor 22. In one embodiment, the biomass-based feedstock 14, the catalyst 16, the organic solvent 18, and the hydrogen-containing gas 20 are each introduced separately to the reactor 22 along lines 24, 26, 28, and 30, respectively. As illustrated, the apparatus 10 may optionally utilize an inert inorganic solid particulate heat carrier 32, such as, for example, sand and/or the like, that is passed along lines 34 and 36 and introduced to a first heater 38. The first heater 38 may be an electric heater, an indirect fired heater, a heat exchanger, or any other device known to those skilled in the art for heating a process stream. The inert inorganic solid particulate heat carrier 32 is advanced through the first heater 38 to produce a heated stream 40 that is introduced to the reactor 22.

In an alternative embodiment, the catalyst 16, the organic solvent 18, the hydrogen-containing gas 20, or a combination thereof may be advanced along lines 42, 44, and/or 46, respectively, and combined along line 36 either with or without the inert inorganic solid particulate heat carrier 32 for introduction to the first heater 38 to form the heated stream 40. Preferably, the heated stream 40 has a temperature such that when it is introduced to the reactor 22 with the other component or components contained therein (e.g., the biomass-based feedstock 14, the catalyst 16, the organic solvent 18, and/or the hydrogen-containing gas 20), the other component or components including the biomass-based feedstock 14 are rapidly heated to a first predetermined temperature of from about 300 to about 650° C. within a time period of about 20 minutes or less, preferably from about 0.5 seconds to about 20 minutes, more preferably from about 1 second to about 5 minutes, more preferably from about 1 second to about 2 minutes, and most preferably from about 1 second to about 3 seconds.

In one example, the catalyst 16 is advanced along line 42 to line 36, and the organic solvent 18 is advanced along line 44 and combined with the catalyst 16 along line 36 upstream from the first heater 38. The catalyst 16 may be a dissolvable solid material that is dissolved in the organic solvent 18, or alternatively, the catalyst 16 may be insoluble in the organic solvent 18 and form a catalyst slurry.

As illustrated, the apparatus 10 may optionally comprise a second heater 48 that is in fluid communication with the biomass-based feedstock 14 via line 24 and that heats the biomass-based feedstock 14 before introduction to the reactor 22. In an exemplary embodiment, the biomass-based feedstock 14 is advanced through the second heater 48 and is preheated to a second predetermined temperature of from about 50 to about 300° C. Preferably, pre-heating the biomass-based feedstock 14 prior to introduction to the reactor 22 facilitates rapidly heating the biomass-based feedstock 14 in the reactor 22 to the first predetermined temperature, thereby reducing gas and solid by-product formation.

In another embodiment, the catalyst 16, the organic solvent 18, the hydrogen-containing gas 20, or a combination thereof may be advanced along lines 50, 52, and/or 54, respectively, and combined with the biomass-based feedstock 14 along line 24 to form a biomass-based-containing mixture. The biomass-based-containing mixture is advanced along line 24 through the second heater 48 if present for optionally pre-heating the biomass-based containing mixture to the second predetermined temperature for introduction to the reactor 22. In one example, the catalyst 16 is combined with the biomass-based feedstock 14 forming a physical mixture of the biomass-based feedstock 14 and the catalyst 16. In another example, the catalyst 16 is dissolved in water or a suitable organic solvent to form a solution, and the solution is combined with the biomass-based feedstock 14. Incorporation of the catalyst-solution into the biomass-based feedstock 14 can be achieved in any fashion known to those skilled in the art, such as, for example, by combining the two process streams respectively containing the biomass-based feedstock 14 and the catalyst-solution, submerging the biomass-based feedstock 14 in a container that contains the solution, or spraying or brushing the solution onto the biomass-based feedstock. Optionally, the biomass-based feedstock 14 that is wetted with the catalyst-solution may be dried to remove any water or solvent, such as, for example, by passing the wetted combination through a kiln, dryer, or any other equipment for drying. After drying, the catalyst 16 remains on the biomass-based feedstock 14 to produce a catalyst-impregnated biomass-based feedstock that is introduced to the reactor 22.

Regardless of which pathways the catalyst 16 and the biomass-based feedstock 14 are advanced along for introduction to the reactor 22, preferably the weight ratio of the catalyst 16 to the biomass-based feedstock 14 in the reactor 22 is from about 1:200 to about 1:1, more preferably from about 1:100 to about 1:5, and most preferably from about 1:100 to about 1:20. However, various embodiments contemplated herein may use more or less catalyst 16 relative to the amount of biomass-based feedstock 14.

In an exemplary embodiment, the biomass-based containing mixture is formed by combining the biomass-based feedstock 14 with the organic solvent 18 to form a biomass-based feedstock slurry. In particular, a first portion of the organic solvent 18 is advanced along line 52 and combined with the biomass-based feedstock 14 along line 24 to form the biomass-based feedstock slurry. The biomass-based feedstock slurry may be passed through the second heater 48 if present and heated to the second predetermined temperature for introduction to the reactor 22, or alternatively, may be passed along line 24 directly to the reactor 22 without being passed through the second heater 48. In one example, the biomass-based feedstock slurry is introduced to the reactor 22 at a temperature of from about 10 to about 300° C. Preferably, the biomass-based feedstock slurry has a weight ratio of the biomass-based feedstock 14 to the organic solvent 18 of from about 1:100 to about 1:1, and more preferably from about 1:10 to about 1:2. However, various embodiments contemplated herein may use more or less biomass-based feedstock 14 relative to the amount of organic solvent 18 to form the biomass-based feedstock slurry.

A second portion of the organic solvent 18 may be introduced to the first heater 38 via lines 44 and 36 and heated to form the heated stream 40 for introduction to the reactor 22. The second portion of the organic solvent 18 may be heated to the first predetermined temperature of from about 300 to about 650° C. Alternatively, the second portion of the organic solvent 18 may be heated to a temperature greater than about 650° C. and cooled to the first predetermined temperature.

Preferably, the reactor 22 is operating at a reactor pressure of up to about 17,200 kPa, and more preferably from about 3,000 to about 13,800 kPa. The biomass-based feedstock 14 is rapidly heated to the first predetermined temperature in the presence of the catalyst 16, the hydrogen-containing gas 20, and the organic solvent 18, and the reactor 22 is maintained at a reactor temperature of from about 300 to about 650° C., and preferably from about 400 to about 600° C. to form the aromatic hydrocarbon-containing effluent 12.

In one embodiment, the catalyst 16 is pre-sulfided and comprises a metal sulfide or a mixed metal sulfide. When the hydrogen-containing gas 20 combines with the pre-sulfided catalyst 16 in the reactor 22 that is operating at the reactor pressure and temperature, the lignocellulosic material and/or lignin in the biomass-based feedstock 14 breakdown, for example, over a time period of preferably about 0.5 seconds to about 20 minutes to form the aromatic hydrocarbon-containing effluent 12. Alternatively, the catalyst 16 may be sulfided by a sulfur-containing organic compound in the organic solvent 18 or $H_2S$ in the hydrogen-containing gas 20. When the hydrogen-containing gas 20 and the sulfur contained in the organic solvent 18 combine with the catalyst 16 in the reactor 22 that is operating at the reactor pressure and temperature, the catalyst 16 forms a metal sulfide or a mixed metal sulfide that promotes the breakdown of the biomass-based feedstock 14, for example, over a time period of preferably about 0.5 seconds to about 20 minutes to form the aromatic hydrocarbon-containing effluent 12.

In an exemplary embodiment, the conversion of the biomass-based feedstock 14 in the reactor 22 is about 90% or greater with about 80% or greater selectivity towards forming aromatic hydrocarbons to produce the aromatic hydrocarbon-containing effluent 12. Preferably, the aromatic hydrocarbon-containing effluent 12 is rich in aromatic hydrocarbons and may be used as a precursor to or directly as a biofuel and/or as a basic chemical constituent with little or no additional operations required to fully or partially deoxygenate the effluent.

In addition to the aromatic hydrocarbons, the aromatic hydrocarbon-containing effluent 12 may also contain other compounds, such as, for example, paraffins, olefins, naphthenes, phenolic compounds, aldehydes, ketones, sugars, water, carbon monoxide, carbon dioxide, and acids. As illustrated, in an exemplary embodiment, the aromatic hydrocarbon-containing effluent 12 is passed along to a separation zone 56. The separation zone 56 may be configured to perform any number of possible separation and/or purification steps including flash separation, distillation, solvent extraction, adsorption, and the like. The other compounds including, for example, water, carbon monoxide, carbon dioxide, and/or other impurities are removed from the aromatic hydrocarbon-containing effluent 12 to form an aromatic hydrocarbon-rich effluent that may be removed from the apparatus 10 along line 58 for further processing, such as, for example, hydroprocessing, hydrocracking, isomerization, catalytic reforming, and the like, to form other desired products. Alternatively or additionally, at least a portion of the aromatic hydrocarbon-rich effluent may be passed along line 60 and used as at least a portion of the organic solvent 18 for recycling back to the reactor 22 to produce additional aromatic hydrocarbons from additional quantities of the biomass-based feedstock 14. The other compounds including the impurities may be removed from the separation zone 56 along line 62. Alternatively or additionally, the aromatic hydrocarbon-containing effluent 12 may also contain hydrogen gas that may be separated in the separation zone 56 and passed along line 64 to be used as at least a portion of the hydrogen-containing gas 20 for recycling back to the reactor 22.

Accordingly, methods and apparatuses for producing an aromatic hydrocarbon-containing effluent from a biomass-based feedstock have been described. The biomass-based feedstock comprises lignocellulosic material and/or lignin. Unlike the prior art, the exemplary embodiments taught herein rapidly heat the biomass-based feedstock to a first predetermined temperature of from about 300 to about 650° C. in the presence of a catalyst, hydrogen, and an organic solvent within a time period of about 20 minutes or less to form an aromatic hydrocarbon-containing effluent. Rapidly heating the biomass-based feedstock in the presence of the catalyst, hydrogen, and the organic solvent provides an improved process for breaking down lignocellulosic material and/or lignin into useful aromatic hydrocarbon compounds. In an exemplary embodiment, the conversion of the biomass-based feedstock is about 90% or greater with about 80% or greater selectivity towards forming aromatic hydrocarbons to produce the effluent that is rich in aromatic hydrocarbons and that may be used as a precursor to or directly as a biofuel and/or as a basic chemical constituent with little or no additional operations required to fully or partially deoxygenate the effluent. Moreover, the methods and apparatuses contemplated herein do not use caustic materials for depolymerizing the lignin and therefore, are environmentally-friendly for converting lignocellulosic material and/or lignin to an aromatic hydrocarbon-containing product.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for producing an aromatic hydrocarbon-rich effluent, the method comprising the step of:

heating a biomass-based feedstock to a first predetermined temperature of from about 300 to about 650° C. in the presence of a catalyst, hydrogen, and an organic solvent within a time period of about 1 second to about 5 minutes to form the aromatic hydrocarbon-containing effluent, wherein the biomass-based feedstock comprises lignocellulosic material, lignin, or a combination thereof; and
extracting aromatic hydrocarbons from the aromatic hydrocarbon-containing effluent to form the aromatic hydrocarbon-rich effluent.

2. The method according to claim 1, wherein the step of heating includes heating the biomass-based feedstock in the presence of the catalyst, wherein a weight ratio of the catalyst to the biomass-based feedstock is from about 1:200 to about 1:1.

3. The method according to claim 1, wherein the step of heating includes heating the biomass-based feedstock in a reactor, and the method further comprises the step of:
preheating the biomass-based feedstock to a second predetermined temperature of from about 50 to about 300° C. before heating the biomass-based feedstock.

4. The method according to claim 1, wherein the step of heating includes heating the biomass-based feedstock in a reactor, and the method further comprises the step of:
combining the biomass-based feedstock with the catalyst, hydrogen, at least a first portion the organic solvent, or a combination thereof to form a biomass-based mixture, wherein the step of combining is performed before the step of heating.

5. The method according to claim 4, further comprising the steps of:
forming a heated stream comprising the catalyst, hydrogen, at least a second portion of the organic solvent, an inert inorganic solid particulate heat carrier, or a combination thereof; and
contacting the biomass-based mixture with the heated stream to heat the biomass-based feedstock to the first predetermined temperature.

6. The method according to claim 5, further comprising the step of:
preheating the biomass-based mixture to a second predetermined temperature of from about 50 to about 300° C., and wherein the step of introducing the biomass-based mixture includes introducing the biomass-based mixture at the second predetermined temperature to the reactor.

7. The method according to claim 1, further comprising the steps of:
forming a heated stream comprising the catalyst, hydrogen, the organic solvent, an inert inorganic solid particulate heat carrier, or a combination thereof; and
contacting the biomass-based feedstock with the heated stream to heat the biomass-based feedstock to the first predetermined temperature.

8. The method according to claim 1, wherein the step of heating includes heating the biomass-based feedstock in a reactor that is operating at a pressure of from about 3,000 to about 13,800 kPa.

9. The method according to claim 1, wherein the step of heating includes heating the biomass-based feedstock in the presence of the catalyst that comprises a material selected from the group consisting of transition metals, transition metal sulfides, nitrides, carbides, noble metals, and combinations thereof.

10. The method according to claim 1, wherein the step of heating includes heating the biomass-based feedstock in the presence of the catalyst that comprises a metal disposed on a support material.

11. The method according to claim 10, wherein the step of heating includes heating the biomass-based feedstock in the presence of the catalyst that comprises the metal that is selected from the group consisting of nickel, molybdenum, tungsten, cobalt, chromium, platinum, palladium, rhodium, rhenium, osmium, ruthenium, iridium, and combinations thereof.

12. The method according to claim 10, wherein the step of heating includes heating the biomass-based feedstock in the presence of the catalyst that comprises the support material that is selected from the group consisting of alumina, alumina inorganic oxides, boron nitrides, silica, titania, zirconia, carbon, silicon carbide, silica-alumina, magnesia, a molecular sieve, and combinations thereof.

13. The method according to claim 12, wherein the step of heating includes heating the biomass-based feedstock in the presence of the catalyst that comprises the molecular sieve that is selected from the group consisting of beta zeolite, Y-zeolite, MFI type zeolites, MEL type zeolites, mordenite, SM3, faujasite, and combinations thereof.

14. The method according to claim 1, wherein the step of heating includes heating the biomass-based feedstock in the presence of the organic solvent that comprises aromatic hydrocarbons.

15. A method for producing an aromatic hydrocarbon-rich effluent, the method comprising the steps of:
heating a first quantity of a biomass-based feedstock in a reactor to a first predetermined temperature of from about 300 to about 600° C. in the presence of a catalyst, hydrogen, and an organic solvent within a first time period of about 1 second to about 5 minutes to form a first quantity of the aromatic hydrocarbon-containing effluent, wherein the biomass-based feedstock comprises lignocellulosic material, lignin, or a combination thereof;
removing the first quantity of the aromatic hydrocarbon-containing effluent from the reactor;
recycling at least a portion of the first quantity of the aromatic hydrocarbon-containing effluent back to the reactor;
heating a second quantity of the biomass-based feedstock in the reactor to the first predetermined temperature in the presence of the catalyst, hydrogen, and the at least the portion of the first quantity of the aromatic hydrocarbon-containing effluent within a second time period of about 1 second to about 5 minutes to form a second quantity of the aromatic hydrocarbon-containing effluent; and
extracting aromatic hydrocarbons from the aromatic hydrocarbon-containing effluent to form the aromatic hydrocarbon-rich effluent after the step of removing and prior to the step of recycling.

16. The method according to claim 15, wherein the aromatic hydrocarbon-containing effluent contains hydrogen, and the method further comprises the step of recycling hydrogen from the aromatic hydrocarbon-containing effluent back to the reactor.

17. The method according to claim 15, further comprising the steps of:
introducing a heated stream to the reactor, wherein the heated stream comprises the catalyst, hydrogen, at least a portion of the organic solvent, an inert inorganic solid particulate heat carrier, or a combination thereof; and
contacting the first quantity of the biomass-based feedstock with the heated stream to heat the first quantity of the biomass-based feedstock to the first predetermined temperature.

* * * * *